(12) United States Patent
Kluga (10) Patent No.: US 10,747,196 B2
(45) Date of Patent: Aug. 18, 2020

(54) BLAST WAVE DETECTOR

(71) Applicant: Hamilton Sundstrand Corporation, Charlotte, NC (US)

(72) Inventor: Jason Michael Kluga, Sycamore, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 178 days.

(21) Appl. No.: 15/953,730

(22) Filed: Apr. 16, 2018

(65) Prior Publication Data

US 2019/0317473 A1    Oct. 17, 2019

(51) Int. Cl.

| G01L 9/00 | (2006.01) |
|---|---|
| G05B 19/406 | (2006.01) |
| B64D 45/00 | (2006.01) |
| G01L 9/12 | (2006.01) |
| G01L 15/00 | (2006.01) |

(52) U.S. Cl.
CPC .......... *G05B 19/406* (2013.01); *B64D 45/00* (2013.01); *G01L 9/0005* (2013.01); *G01L 9/12* (2013.01); *G01L 15/00* (2013.01); *G05B 2219/37399* (2013.01)

(58) Field of Classification Search
CPC ........ G05B 19/406; G05B 2219/37399; G01L 15/00; G01L 15/14; G01L 9/12; G01L 9/0005; G01L 1/142; B64D 45/00; F41J 5/06
See application file for complete search history.

(56) References Cited

U.S. PATENT DOCUMENTS

| 3,108,466 | A | | 10/1963 | Sander et al. |
|---|---|---|---|---|
| 3,946,175 | A | * | 3/1976 | Sitabkhan ............... G01L 19/04 200/83 L |
| 4,366,716 | A | * | 1/1983 | Yoshida ............... G01D 5/2417 361/283.1 |
| 5,214,614 | A | | 5/1993 | Baule |
| 6,331,161 | B1 | | 12/2001 | Chesney et al. |
| 8,261,607 | B2 | | 9/2012 | Coates et al. |
| 2006/0074479 | A1 | * | 4/2006 | Bailey ...................... A61B 5/01 623/1.13 |
| 2013/0247676 | A1 | * | 9/2013 | Uchiyama ............. G01L 9/0019 73/721 |
| 2015/0125008 | A1 | | 5/2015 | Lust et al. |

FOREIGN PATENT DOCUMENTS

| CN | 105891563 A | 8/2016 |
|---|---|---|
| EP | 3118597 A1 | 1/2017 |

OTHER PUBLICATIONS

European Search Report for Application No. 19168754.0-1001 dated Sep. 18, 2019, 10 pages.

* cited by examiner

*Primary Examiner* — Suman K Nath (74) *Attorney, Agent, or Firm* — Cantor Colburn LLP (57) ABSTRACT

Embodiments of the invention include devices, systems and methods for operating a pressure wave detector. Embodiments include attaching a plurality of members and a ground plate to a substrate, and coupling the ground plate with the plurality of members attached to the substrate. Embodiments also include measuring a pressure wave by at least one of the plurality of members, converting the pressure wave into an electrical signal representing the pressure wave, and monitoring the pressure wave over a configurable period of time.

16 Claims, 7 Drawing Sheets

BLAST WAVE DETECTOR

BACKGROUND

The present invention generally relates to sensors, and more specifically, to a blast wave detector.

In today's environment, a range of devices are used to measure pressure waves and their effects. Pressure sensors can be used to collect data in a number of applications including instrumentation for weather, aircraft, automobiles, and the like. In addition, the pressure sensors can include different types of devices such as piezoelectric devices, electromagnetic devices, optical sensors, to name a few. For example, seismographs are used to measure the waves caused by earthquakes. The detected signals can be monitored over a period of time to determine patterns of the measured event such as an earthquake.

BRIEF DESCRIPTION

According to one embodiment, a method for operating a blast wave detector is provided. The method includes attaching a plurality of members and a ground plate to a substrate, coupling the ground plate with the plurality of members attached to the substrate, measuring a pressure wave with at least one of the plurality of members, converting measurements of the pressure wave into an electrical signal representing the pressure wave, and monitoring the pressure wave over a configurable period of time.

In addition to one or more of the features described above, or as an alternative, further embodiments may include wherein a distance between the plurality of members and the ground plate alters a capacitance indicating an amount of pressure of the pressure wave.

In addition to one or more of the features described above, or as an alternative, further embodiments may include operating the plurality of members as pressure sensing cantilevers.

In addition to one or more of the features described above, or as an alternative, further embodiments may include determining a direction of an origin of the pressure wave based at least in part on the measurement by at least one of the plurality of members.

In addition to one or more of the features described above, or as an alternative, further embodiments may include determining a magnitude of the pressure wave based at least in part on the measurement by at least one of the plurality of members.

In addition to one or more of the features described above, or as an alternative, further embodiments may include wherein a plurality of pressure wave sensor systems are located on a nose, tail, and wings of an aircraft.

In addition to one or more of the features described above, or as an alternative, further embodiments may include turning off pressure sensitive electronic units based on the measurement of the pressure wave exceeding a threshold.

According to a different embodiment, a pressure wave sensor system for detecting blast waves is provided. The system includes, a substrate, a ground plate coupled to the substrate, a plurality of members coupled to the substrate, and a plurality of lines coupled to the ground plate, the plurality of members and one or more ports on the substrate, wherein one or more ports are coupled to a system for controlling a pressure sensitive electronic unit based at least in part on a detected pressure wave.

In addition to one or more of the features described above, or as an alternative, further embodiments may include wherein the plurality of members are composed of steel and operate as pressure sensing cantilevers.

In addition to one or more of the features described above, or as an alternative, further embodiments may include wherein the ground plate is cylindrical in shape and wherein a distance between the plurality of members and the ground plate alter a capacitance indicating an amount of pressure of the pressure wave.

In addition to one or more of the features described above, or as an alternative, further embodiments may include wherein the plurality of members each include a curved surface.

In addition to one or more of the features described above, or as an alternative, further embodiments may include wherein the plurality of members each include a straight surface.

In addition to one or more of the features described above, or as an alternative, further embodiments may include wherein a plurality of pressure wave sensor systems are located on a nose, tail, and wings of an aircraft.

In addition to one or more of the features described above, or as an alternative, further embodiments may include wherein the plurality of members determines a direction of an origin of the pressure wave based at least in part on a measurement by at least one of the plurality of members.

In addition to one or more of the features described above, or as an alternative, further embodiments may include wherein the plurality of members determines a magnitude of the pressure wave based at least in part on a measurement by at least one of the plurality of members.

In addition to one or more of the features described above, or as an alternative, further embodiments may include wherein the pressure sensing system is coupled to pressure sensitive electronic units to control the pressure sensitive electronic units based at least in part on a measurement of the pressure wave exceeding a threshold.

According to another embodiment, devices for a blast wave detector are provided. The devices include a substrate, a ground plate coupled to the substrate, a plurality of members coupled to the substrate, one or more ports, and one or more lines coupled to the ground plate, the plurality of members and one or more ports on the substrate, wherein one or more ports are coupled to a system for controlling a pressure sensitive electronic unit based at least in part on a detected pressure wave.

In addition to one or more of the features described above, or as an alternative, further embodiments may include wherein a distance between the plurality of members and the ground plate alters a capacitance indicating an amount of pressure of a measured pressure wave.

In addition to one or more of the features described above, or as an alternative, further embodiments may include wherein the plurality of members determines a direction of an origin of the pressure wave based at least in part on a measurement by at least one of the plurality of members, and wherein the plurality of members determines a magnitude of the pressure wave based at least in part on a measurement by at least one of the plurality of members.

In addition to one or more of the features described above, or as an alternative, further embodiments may include wherein a plurality of the devices are located on a nose, tail, and wings of an aircraft and controls pressure sensitive electronic units based on a measurement of a pressure wave exceeding a threshold.

BRIEF DESCRIPTION OF THE DRAWINGS

The following descriptions should not be considered limiting in any way. With reference to the accompanying drawings, like elements are numbered alike.

DETAILED DESCRIPTION

In today's environment, blasts waves and pressure waves caused by nuclear explosions are generally detected by ionizing radiation of xenon isotopes. In addition, other techniques include using seismographs to determine and monitor the occurrence of resulting waves caused by a pressure changing event. In one example, seismographs are currently used to measure the resulting waves caused by earthquakes.

However, seismographs are limited to detecting the effects of the waves in a particular direction. For example, seismographs can detect the intensity of the vibrational waves in a horizontal or vertical direction and can measure the magnitude of the vibrations. No information is provided with regards to the directional origin of the detected wave. And waves are not restricted to propagating in a single horizontal or vertical direction.

In a different example involving aircraft, pressure conditions are measured remotely from the aircraft. Further, metrics are calculated on the ground and transmitted to the pilot, but the conditions at altitude are not calculated during flight. Although larger aircrafts can fly through turbulent air, smaller aircraft may be exposed to safety risks when flying through the same conditions. Currently, weather balloons are used to collect weather data and the results are processed at a weather station. Subsequently, the information is transmitted to an aircraft that may be headed towards the weather detected weather conditions. The information sent to the pilot of the aircraft may or may not be particularly relevant because the data collection may not have occurred in proximate location of the aircraft. There is no reliable way of determining where the pressure condition is being experienced.

The electromechanical systems, devices and techniques described herein can be configured to detect various pressure waves including but not limited to acoustic or sound waves, high force winds, earthquakes, explosions (nuclear blasts) and the like. Configurations of the system and devices include one or more members (columns) of a sensor system that are movable responsive to a detected pressure wave. The sensor system functions as a capacitive pressure sensing system. The capacitance and change in voltage due to the deflection of the columns of the system is measured with an AC current, and the data related to the magnitude of the measured pressure wave can be collected by the blast wave detector described herein. Also, the orientation of the plurality of columns provides for the detection of the origin of the pressure wave.

In addition, the blast wave detector can be designed according to different forces and types of pressure waves to be monitored. For example, one or more components of the detector can be modified to provide accurate measurements and readings responsive to monitoring pressure blasts or acoustic waves. The configuration of the blast wave detector can provide directional information unlike the conventional seismographs.

The pressure wave detector described herein allows the pressure wave measurements and data to be collected while positioned on existing equipment such as aircraft and strategically located towers. For example, the blast wave detector can be implemented on an aircraft to determine weather and pressure conditions that may not be safe for the crew and passengers on board. The data that is collected will be relevant to the aircraft that is experiencing the weather conditions because the measurements are taken from the aircraft. The safety of the passengers and crew is increased by the enhanced ability to measure conditions at altitude. In addition to detecting flight conditions, the collected data is critical in analyzing meteorology and other weather conditions used for various applications.

Figure 1:
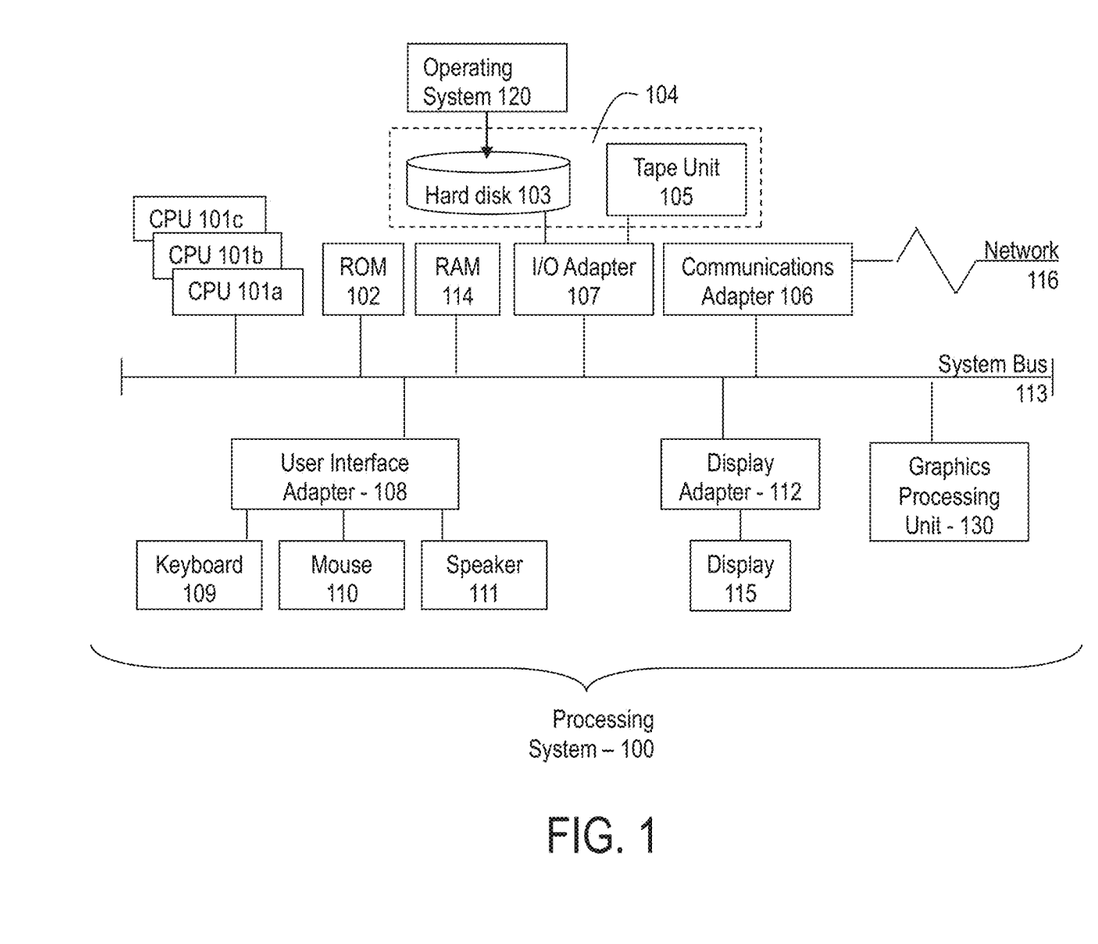
FIG. 1 depicts a system for practicing the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a super I/O chip integrating multiple device adapters into a single integrated circuit.

In embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
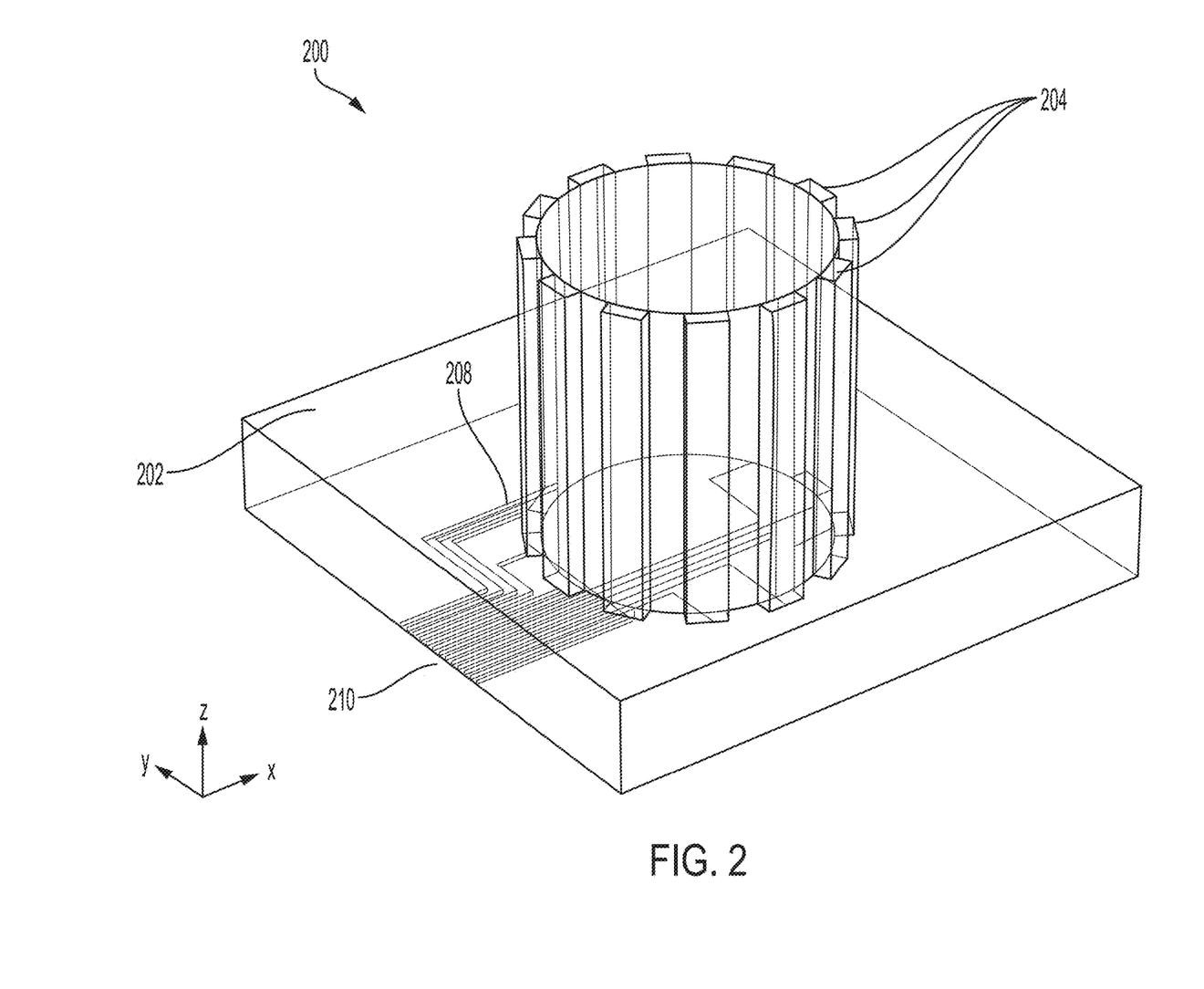
FIG. 2 depicts a blast wave detector in accordance with one or more embodiments of the invention.

Now referring to FIG. 2, a diagram 200 of a blast wave detector for monitoring pressure waves is shown. The blast wave detector includes a substrate 202 where a plurality of members/columns 204 is coupled to a first side of the substrate 202. In one or more embodiments of the invention, the substrate 202 is 30 millimeters (mm) by 30 mm. The blast wave detector also includes a ground plate 206. In one or more embodiments of the invention, the radius of the cylinder of the ground plate 206 can be 6.91 mm. It is to be understood that other radii and designs are considered within the scope of the invention. In one or more embodiments of the invention, the ground plate 206 is stationary and the members 204 function as cantilevers where a capacitance between each member 204 and the ground plate 206 can be measured and monitored over a configurable period of time when an AC signal is applied to the members 204 and the ground plate 206. The plurality of members 204 are flexible conductors where the members 204 are affixed to the substrate 202 and extend outward from the substrate 202. The members 204 function as cantilevers and the top portion of the members 204 is free to move. In the configuration shown in FIG. 2, 12 members 204 (columns) are used to ensure computations of a detected pressure wave are not inhibitive to processing the pressure wave data. In addition, the members 204 as shown are positioned radially outward every 30 degrees which provides the capability to pinpoint the direction of the origin of the detected pressure wave.

In one or more embodiments, when performing measurements of the pressure wave or blast, an AC signal is provided to each of the plurality of members 204 and the ground plate 206. The detected signal can be converted into a digital signal vie a $2^n$ quadrature amplitude modulation (QAM) bit constellation which correlates the analog frequency response of each RC (capacitive) circuit with a sequence of bits that can be processed by a digital signal processor (DSP) to carry the analog data digitally. The DSP is configured to record the sequence of bits and can also be configured to average the values to determine the magnitude of pressure represented by the bits. The DSP can be further configured to implement noise reduction algorithms in the case of employing signal amplification, as well as configured to use error correcting codes (ECC), such as feedforward equalization and feedback equalization in which the discrete data is compared to an array of its neighbors to verify the accuracy of its measurements.

As a pressure wave is detected the plurality of members 204 respond to the experienced pressure, where the deflection of each of the plurality of members 204 cause a change in capacitance which is monitored. The capacitance between each of the plurality of members 204 and the ground plate 206 can be independently monitored and stored. In an embodiment of the invention, the overall capacitive pressure sensor has a cylindrical form and has an overall capacitance of 31.1 pF absent any applied pressure. In a non-limiting example, the results of the capacitance can be stored, processed, and analyzed by a system such as the system 100 shown in FIG. 1. The plurality of members 204 and the ground plate 206 can be composed of steel or a different metal or alloy.

In addition, the design of each of the members 204 can include different configurations such as the number of members 204, height, width, thickness, curvature of each member 204, etc. In one or more embodiments, the members 204 do not have any curvature and are straight on the face of the members detecting the pressure wave. In the event, too few columns are used in the blast wave detector, sufficient data cannot be collected to determine reliable magnitude and directions data for a detected blast waved. On the other hand, if too many columns are included in the design, the processing and computations can become prohibitive.

The design of the blast wave detector can be selected based on the type of pressure wave to be detected. In a non-limiting example, if acoustic waves are to be detected, the plurality of members can be designed as narrow and rectangular members to increase the sensitivity to pressure waves. In another non-limiting example, if high pressure winds are to be detected, wider rectangular members can be used.

If high magnitude pressure waves or blasts such as nuclear blasts are to be detected the plurality of members 204 can be designed to include a small curvature on each of the surrounding members 204. The curvature of the plurality of members 204 increases the rigidity of each of the members 204 and its ability to detect various types of waves.

Coupled to each of the members 204 and the ground plate 206 are lines 208 or wires. The lines 208 are connected to an edge of the substrate 202 providing ports 210. The signal associated with the measured pressure waves is transmitted through the lines 208 and provided to the ports 210. In one or more embodiments, the ports 210 can be coupled to an external device/system, such as that shown in FIG. 1, to process and analyze the detected signal. In addition, the signals can be represented to a user in graph form such including the frequency response of the detected wave. The measurements can be monitored to track the morphology of the detected pressure wave.

In one or more embodiments of the invention, a combination of blast wave detectors can be equipped on an aircraft. For example, blast wave detectors can be positioned on each wing, the head and tail of the aircraft to determine the pressure conditions experienced from the aircraft instead of relying on e.g. weather data received from a remote weather station. The pressure conditions can be measured during take-off or during flight. In addition, the pressure sensitive electronics can be protected based on the detection of a pressure condition exceeding a configurable threshold condition, where a system such as system 100 of FIG. 1 can control the pressure sensitive electronics by reducing power or turning the power off to the respective devices. In addition, a flight path can be altered based at least in part on the configurable threshold. In other applications, blast wave detectors can be positioned on mobile towers and networks across a geographic area to collect data and monitor trends during a pressure wave event.

Figure 3:
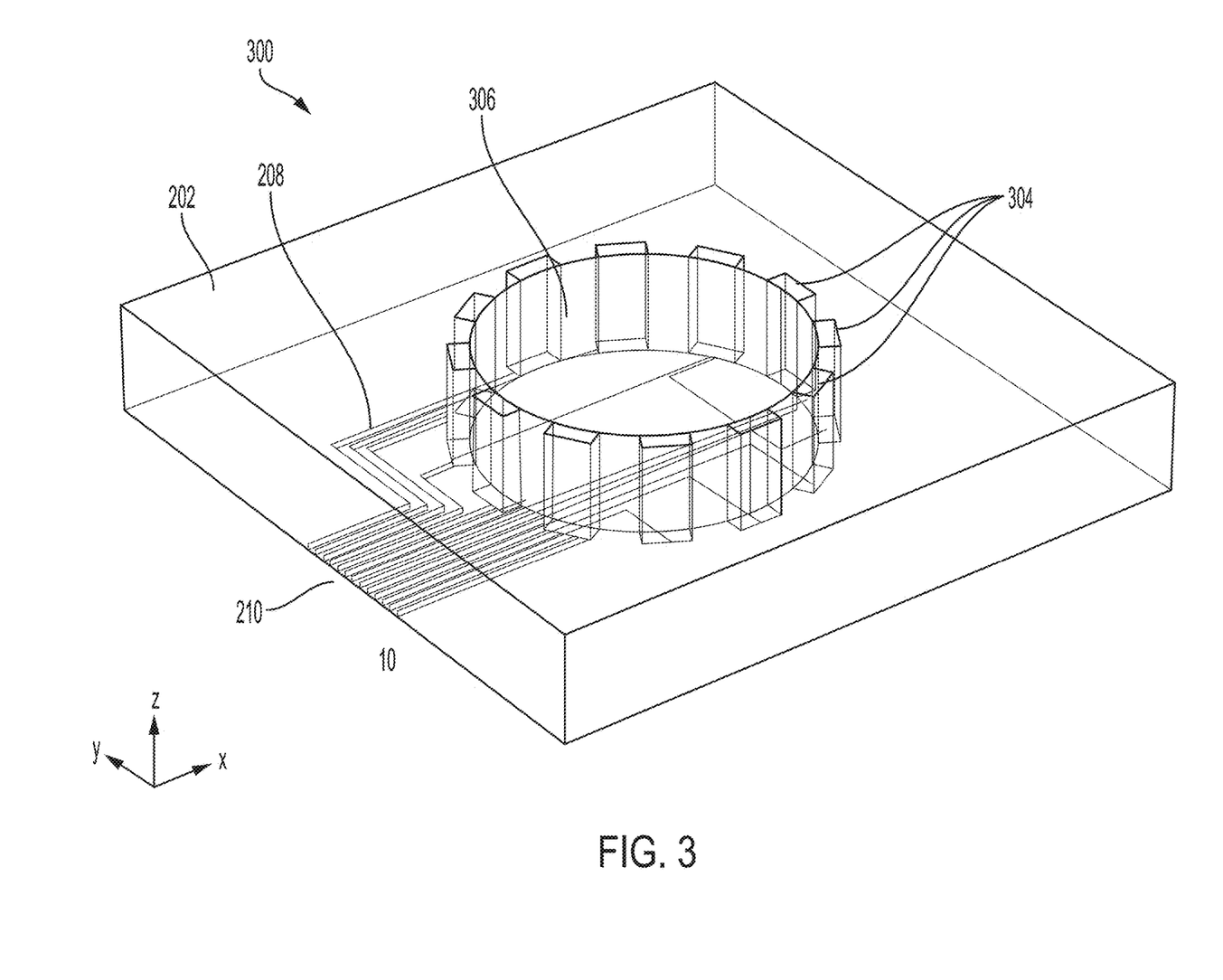
FIG. 3 depicts another blast wave detector in accordance with one or more embodiments of the invention.

Now referring to FIG. 3, a diagram 300 of a blast wave detector is shown. The blast wave detector of FIG. 3 is similar to the blast wave detector shown in FIG. 2. The blast wave detector includes a substrate 202, a plurality of members 304, a ground plate 306, lead lines 208, and ports 210.

In this non-limiting example, the height of the plurality of members 304 and the ground plate 306 are different than the height of the plurality of members 204 and the ground plate 206. The configuration can be altered based on its application. In one or more embodiments of the invention, the plurality of members 204 does not have a curvature in their design. This non-limiting design allows for lower magnitude pressure waves to be detected. In another non-limiting example, the plurality of members 204 are designed with a slight curvature which allows for higher magnitude pressure waves, such as blast waves from explosions and nuclear blasts, to be detected.

Figure 4:
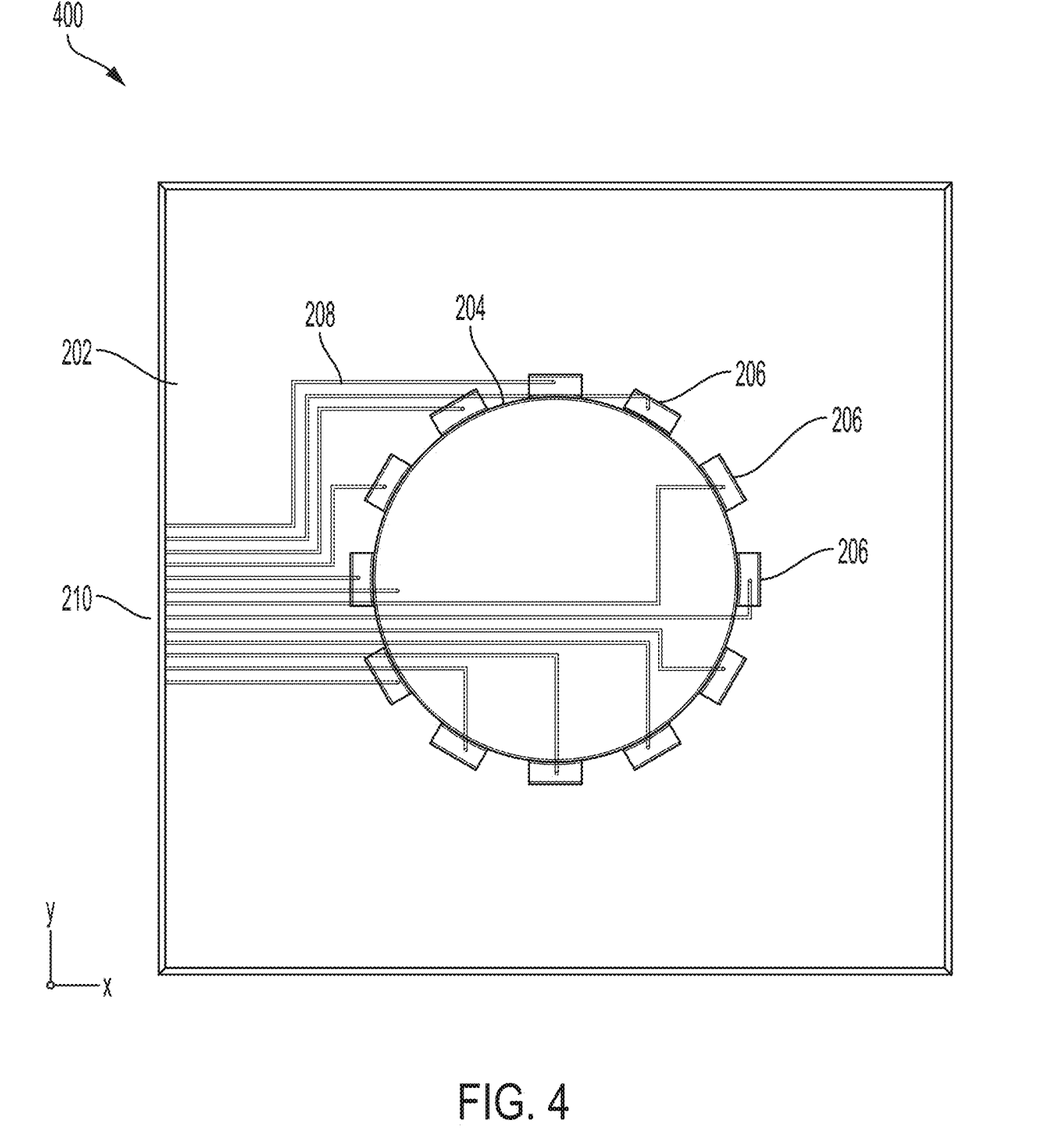
FIG. 4 depicts a view of a blast wave detector in accordance with one or more embodiments of the invention.

Now referring to FIG. 4, a top down view 400 of the blast wave detector similar to the blast wave detector of FIG. 2 is shown. The view 400 depicts the substrate 202, the ground plate 206, and the plurality of members 204. Also, the lead lines 208 are shown coupled to each of the plurality of members 204 and ports 210 at the edge of the substrate 202.

Figure 5:
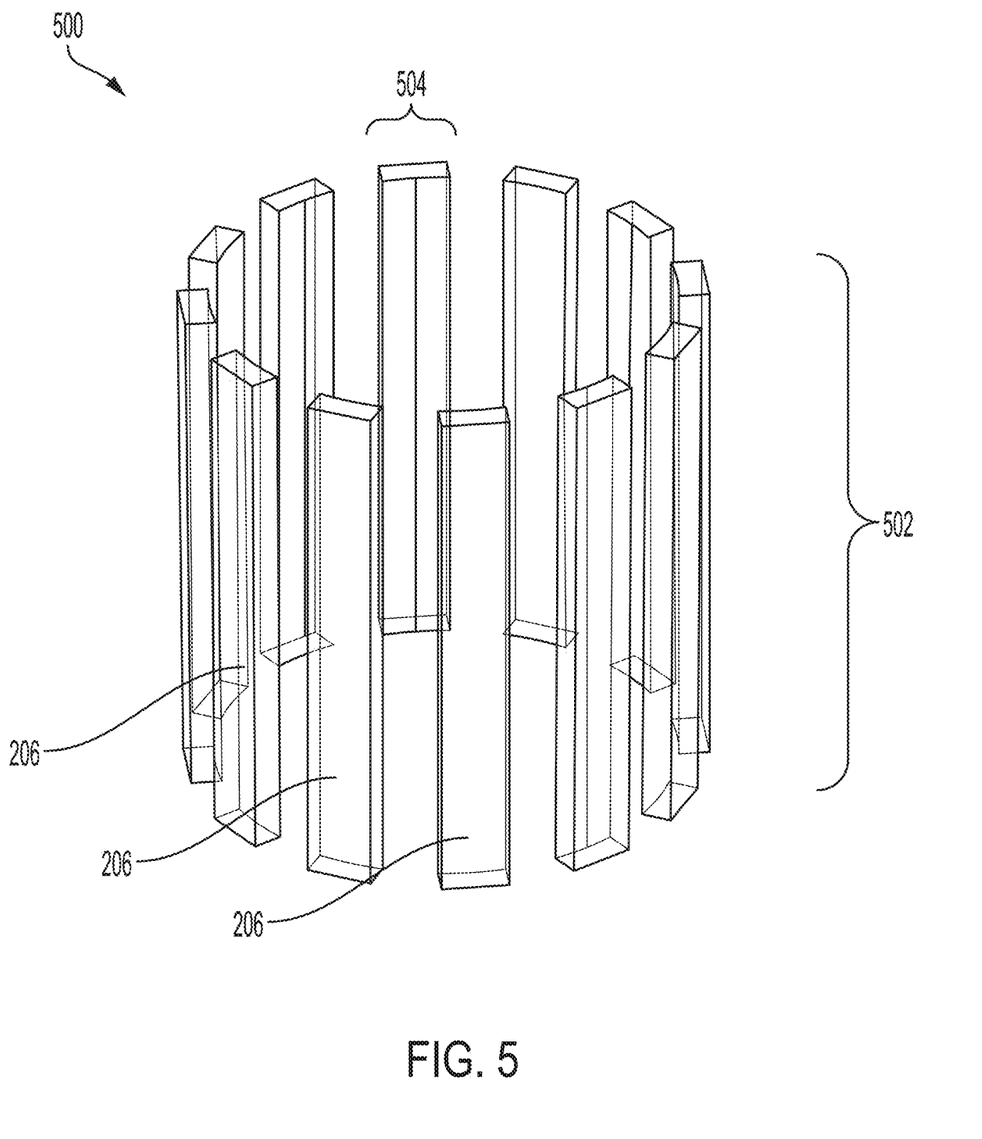
FIG. 5 depicts another view of a blast wave detector in accordance with one or more embodiments of the invention.

Now referring to FIG. 5, another view 500 of a blast wave detector is shown. The plurality of members 206 of FIG. 2 is depicted. The height 502 and the width 504 of the plurality of members 206 can be designed according to the application. In addition, the thickness of each of the plurality of members 206 can be changed. The radius or curvature of each of the plurality of members 206 can be changed based on its application.

Figure 6:
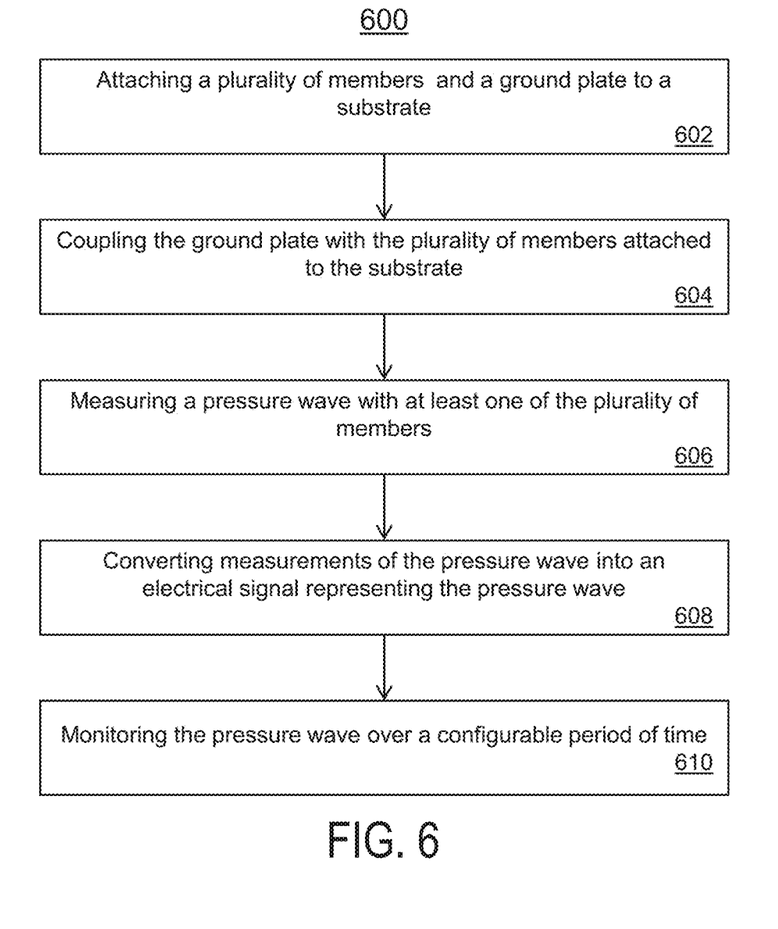
FIG. 6 depicts a flow chart for operating a blast wave detector in accordance with one or more embodiments of the invention.

Now referring to FIG. 6, a flow chart 600 for measuring a blast wave in accordance with one or more embodiments is shown. The techniques of FIG. 6 can be implemented in the sensor system of FIG. 2.

Block 602 provides for attaching a plurality of members and a ground plate to a substrate. The method 600 at block 604 provides for coupling the plurality of members 204 with the cylindrical ground plate 206 attached to the substrate 202.

Block 606 provides for measuring a pressure wave at least at one of the plurality of members. To perform measurements of a detected pressure wave, embodiments include applying an AC signal between each of the plurality of members 204 and the ground plate 206 to measure the capacitance. The ground plate 206 is the central pillar and is connected to ground via a lead wire 208 embedded in the rectangular substrate 202 in which the cylinder and the rectangular cantilevers are also embedded in. Each of the leads 208 are connected to their corresponding cantilevers, as is the ground lead that is connected to the cylinder acting as the ground plate 206, through the bottom of the device e.g. as shown in FIG. 2. The frequency response of each of the circuits can be measured and corresponds to the pressure change detected by the blast wave detecting device. In particular, the plurality of members functions as pressure sensing cantilevers where the force of the detected pressure wave causes a deflection in each of the members 204. The deflection causes a change in the distance between the plurality of members 204 and the ground plate 206 which alters a capacitance corresponding to an amount of pressure of the detected pressure wave. The voltage and capacitance across each of the members 204 and ground plate 206 can be scaled to represent specific distance to characterize the detected pressure wave. In a non-limiting example, for a given configuration of a blast wave detector having the ground plate 206 and plurality of members 204 with an overall capacitance of 31.1 pF absent any applied pressure, any deviation from the capacitance of 31.1 pF can be mapped to a force of the detected pressure wave, where the deviation is provided by the distance between the ground plate 206 and the plurality of members 204.

In one or more embodiments, altering the scale of the device and its components as well as the radial curvature of the cantilevers changes the capacitance between the ground plate cylinder 206 and each of the pressure sensing cantilevers/members 204, changing the frequency response and the sensitivity of the device.

Block 608 provides for converting the pressure wave into an electrical signal representing the pressure wave. In one or more embodiments of the invention, the data indicating a change in the distance between the plurality of members 204 and the ground plate 206 can be converted into an electrical signal such as a voltage, capacitance, frequency response, etc. and monitored. The pressure wave data can be stored externally in a system such as that shown in FIG. 1 or other memory/database system for further analysis.

Block 610 provides for monitoring pressure wave data over a configurable period of time. In one or more embodiments of the invention, the pressure wave data include data indicating a magnitude and directional origin of the pressure wave based at least in part on a measurement by at least one of the plurality of members. It is to be understood that other measurements are considered within the scope of the invention. The measured pressure wave data can be used to control electronic units based on the measurement exceeding a threshold of the detected pressure wave. For example, pressure sensitive electronic units of an aircraft can be turned off during a high pressure wave event based on the detected pressure wave. The measurement can be based on one of a plurality of pressure wave sensor systems located on a nose, tail, and wings of an aircraft or a combination of those pressure wave sensor systems.

Figure 7:
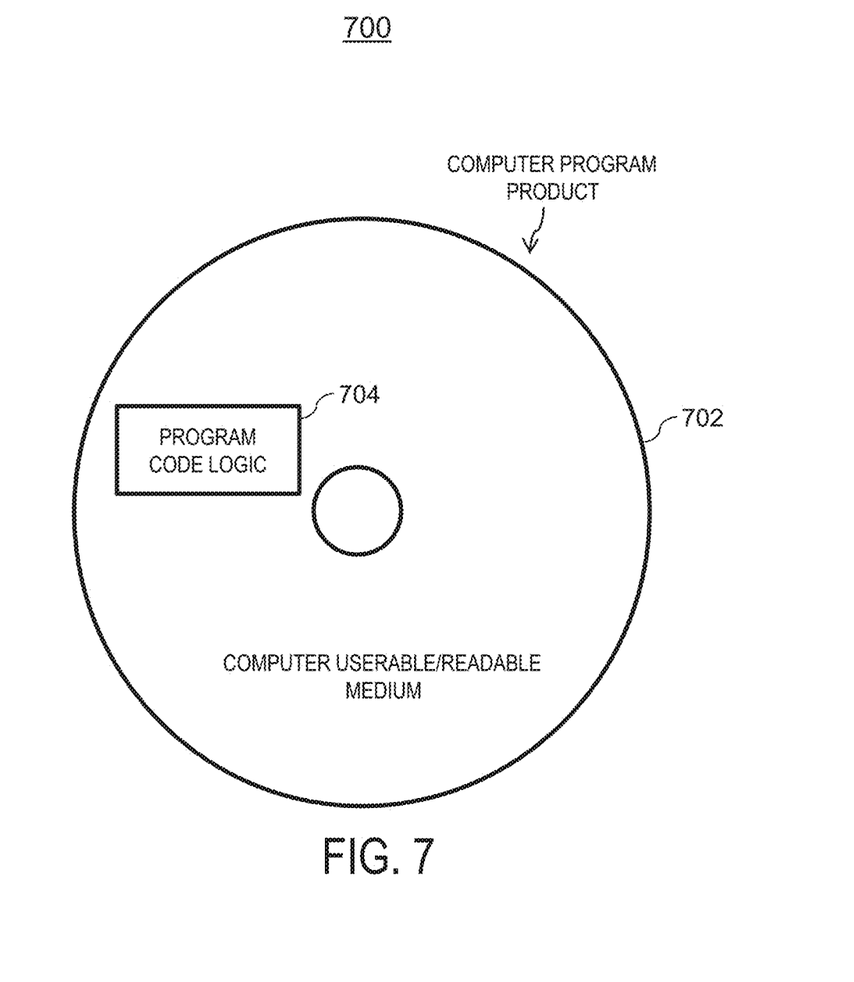
FIG. 7 depicts a computer program product for a blast wave detector in accordance with one or more embodiments of the invention.

Referring now to FIG. 7, a computer program product 700 in accordance with an embodiment that includes a computer readable storage medium 702 and program instructions 704 is generally shown. In one or more embodiments of the invention the program instructions 704 are operable to perform the method shown in FIG. 6.

In one or more embodiments, the detected measurements of the pressure wave can be converted to electrical signals and plotted on a graph such as a frequency response. In some embodiments, the graphs can be provided to a user through graphical user interface such as that shown in the system 100 of FIG. 1. In other embodiments, the user can manually power down pressure sensitive devices to protect them from damage based on analyzing the graph.

The technical benefits and effects of this disclosure include adding pressure sensing devices to existing equipment such as aircraft or towers which are strategically positioned to monitor pressure wave activity. In addition, the system functionality can be altered by making adjustments to the current design of the pressure wave detector that maintain its morphology by modifying the aspect ratio, or using specific conductive materials in the pressure sensing cantilevers. In addition, the radius of the cantilevers or the distance from the ground cylinder can be changed to alter the sensitivity of the pressure wave detector's response to the pressure input from high wind conditions, hurricanes, earthquakes, blast waves, and the like. System power can be reduced in the event of detecting a blast wave that exceeds a configurable threshold. The reduction or elimination of damage potentially caused to pressure sensitive devices can be controlled by turning off the sensitive electronic components when blast wave peak is detected, where electronic components refer to existing equipment that is sensitive to blasts as well as electromagnetic pulses (EMP) and other hazardous conditions. The circuitry for the proposed blast wave detection sensor is designed to be robust enough to withstand the blast peak so that it can relay data to control and preserve more sensitive equipment.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of detecting a pressure wave, comprising:
    attaching a plurality of members and a ground cylinder to a substrate;
    coupling the ground cylinder with the plurality of members attached to the substrate;
    measuring a pressure wave with at least one of the plurality of members;
    operating the plurality of members as pressure sensing cantilevers;
    measuring the pressure wave with the plurality of members;
    converting each of the plurality of measurements of the pressure wave into an electrical signal representing the pressure wave;
    monitoring the pressure wave over a configurable period of time; and
    determining a direction of a source of the pressure wave based at least in part on the plurality of measurements by the plurality of members.

2. The method of claim 1, wherein a distance between the plurality of members and the ground cylinder alters a capacitance indicating an amount of pressure of the pressure wave.

3. The method of claim 1, further comprising determining a magnitude of the pressure wave based at least in part on the plurality of measurements by at least one of the plurality of members.

4. The method of claim 1, wherein a plurality of pressure wave sensor systems are located on a nose, tail, and wings of an aircraft.

5. The method of claim 1, further comprising turning off electronic units based on one of the plurality of measurements exceeding a threshold of the pressure wave.

6. A pressure wave sensor system for detecting a pressure wave, comprising:
    a substrate;
    a ground cylinder coupled to the substrate;
    a plurality of members coupled to the substrate wherein the plurality of members operate as pressure sensing cantilevers, wherein the plurality of members determine a plurality of measurements and a direction of a source of the pressure wave based at least in part on the plurality measurements by the plurality of members; and
    a plurality of lines coupled to the ground cylinder, the plurality of members and one or more ports on the substrate, wherein one or more ports are coupled to a system for controlling a pressure sensitive electronic unit based at least in part on the detected pressure wave.

7. The system of claim 6, wherein a distance between the plurality of members and the ground plate alters a capacitance indicating an amount of pressure of the pressure wave.

8. The system of claim 6, wherein the plurality of members each include a curved surface.

9. The system of claim 6, wherein the plurality of members each include a straight surface.

10. The system of claim 6, wherein a plurality of pressure wave sensor systems are located on a nose, tail, and wings of an aircraft.

11. The system of claim 6, wherein the plurality of members determines a magnitude of the pressure wave based at least in part on a measurement by at least one of the plurality of members.

12. The system of claim 6, wherein the pressure sensing system is coupled to a plurality of pressure sensitive electronic units to control the plurality of pressure sensitive electronic units based at least in part on a measurement of a pressure wave exceeding a threshold.

13. A device for detecting a pressure wave, comprising:
    a substrate;
    a ground cylinder coupled to the substrate;
    a plurality of members coupled to the substrate, wherein the plurality of members operate as pressure sensing cantilevers, wherein the plurality of members are used to determine a plurality of measurements and a direction of a source of the pressure wave based at least in part on the plurality measurements by the plurality of members;
    one or more ports; and
    one or more lines coupled to the ground cylinder, the plurality of members and one or more ports on the substrate, wherein one or more ports are coupled to a system for controlling a pressure sensitive electronic unit based at least in part on a detected pressure wave.

14. The device of claim 13, wherein a distance between the plurality of members and the ground cylinder alters a capacitance indicating an amount of pressure of a measured pressure wave.

15. The device of claim 13, wherein the plurality of members determines a magnitude of the pressure wave based at least in part on a measurement by at least one of the plurality of members.

16. The device of claim 13, wherein a plurality of the devices are located on a nose, tail, and wings of an aircraft and controls pressure sensitive electronic units based on a measurement of the pressure wave exceeding a threshold.

\* \* \* \* \*